United States Patent
Oag et al.

(10) Patent No.: US 12,092,906 B2
(45) Date of Patent: Sep. 17, 2024

(54) FLEXIBLE LIQUID CRYSTAL-CONTAINING LENSES

(71) Applicant: CooperVision International Limited, Fareham (GB)

(72) Inventors: Robert Oag, Southampton (GB); Robin Frith, Southampton (GB); Mikhail Bashtanov, Cambridge (GB)

(73) Assignee: COOPERVISION INTERNATIONAL LIMITED, Fareham (GB)

( * ) Notice: Subject to any disclaimer, the term of this patent is extended or adjusted under 35 U.S.C. 154(b) by 67 days.

(21) Appl. No.: 17/568,743

(22) Filed: Jan. 5, 2022

(65) Prior Publication Data

US 2022/0244571 A1  Aug. 4, 2022

Related U.S. Application Data

(60) Provisional application No. 63/143,157, filed on Jan. 29, 2021.

(51) Int. Cl.
| | | |
|---|---|---|
| G02C 7/08 | (2006.01) | |
| G02C 7/04 | (2006.01) | |
| G02C 7/10 | (2006.01) | |

(52) U.S. Cl.
CPC .............. *G02C 7/083* (2013.01); *G02C 7/04* (2013.01); *G02C 7/08* (2013.01); *G02C 7/101* (2013.01);
(Continued)

(58) Field of Classification Search
CPC .... G02C 7/083–085; G02C 7/04; G02C 7/08; G02C 7/101
See application file for complete search history.

(56) References Cited

U.S. PATENT DOCUMENTS

| | | | | |
|---|---|---|---|---|
| 8,821,811 B2 * | 9/2014 | Liu | .................... | G01N 21/6486 436/95 |
| 8,885,139 B2 * | 11/2014 | Peyghambarian | ........ | G02F 1/29 349/200 |

(Continued)

FOREIGN PATENT DOCUMENTS

| | | |
|---|---|---|
| CN | 103596522 A | 2/2014 |
| CN | 108604023 A | 9/2018 |

(Continued)

OTHER PUBLICATIONS

Combined Search and Examination Report issued in corresponding United Kingdom Patent Application No. GB2200927.8 dated Jul. 27, 2022 (7 pages).

(Continued)

*Primary Examiner* — Dung T Nguyen
(74) *Attorney, Agent, or Firm* — Kilyk & Bowersox, P.L.L.C.

(57) ABSTRACT

Electrically-switchable flexible ophthalmic lenses for conforming to the eye of a user are provided. The lenses comprise: a liquid crystal cell for changing an optical characteristic of the ophthalmic lens, and having a cell gap thickness between a first inner surface and a second inner surface with liquid crystal therebetween, the flexible liquid crystal cell having a chord radius, w, and comprising: a plurality of support members, each support member is arranged to maintain the cell gap thickness by providing support at one or more support locations within the cell, and the support members are arranged such that the support locations form two rings concentric with a centre of the liquid crystal cell, the first ring located a chord measurement of 0.26-0.34 w from the centre of the liquid crystal cell and the second ring located a chord measurement of 0.52-0.70 w from the centre of the liquid crystal cell.

20 Claims, 9 Drawing Sheets

(52) U.S. Cl.
CPC ......... *G02C 7/041* (2013.01); *G02C 2202/12* (2013.01); *G02C 2202/20* (2013.01)

(56) References Cited

U.S. PATENT DOCUMENTS

| | | | |
|---|---|---|---|
| 11,520,181 B2* | 12/2022 | Lin | .................. G02F 1/133305 |
| 11,531,216 B2 | 12/2022 | Kubota et al. | |
| 2009/0086331 A1 | 4/2009 | Gunasekaran et al. | |
| 2012/0045619 A1* | 2/2012 | Ando | ...................... G02B 3/08 |
| | | | 264/2.6 |
| 2014/0327875 A1 | 11/2014 | Blum et al. | |
| 2019/0049752 A1 | 2/2019 | Van Heugten et al. | |
| 2019/0049784 A1 | 2/2019 | Lin et al. | |
| 2020/0096814 A1 | 3/2020 | Lin et al. | |
| 2021/0072438 A1* | 3/2021 | Marchal | ................. G02C 7/083 |

FOREIGN PATENT DOCUMENTS

| | | |
|---|---|---|
| CN | 111194425 A | 5/2020 |
| EP | 3255479 A1 | 12/2017 |
| EP | 3581989 A1 | 12/2019 |
| JP | 62-119520 A | 5/1987 |
| JP | S62119520 A | 5/1987 |
| JP | 2006072267 A | 3/2006 |
| TW | 201930986 A | 8/2019 |
| WO | 2020157245 A1 | 8/2020 |

OTHER PUBLICATIONS

International Search Report and Written Opinion issued in corresponding International Patent Application No. PCT/GB2022/050191 dated Apr. 26, 2022 (12 pages).
Office Action issued in corresponding Taiwan Patent Application No. 111102847 issued Apr. 14, 2023 (with English translation)(13 pages).
PCT Demand filed Nov. 18, 2022 in corresponding International Patent Application No. PCT/GB2022/050191 (17 pages).
Second Written Opinion issued in corresponding International Patent Application No. PCT/GB2022/050191 mailed Dec. 9, 2022 (6 pages).
Response to Second Written Opinion filed Jan. 20, 2023 in corresponding International Patent Application No. PCT/GB2022/050191 (10 pages).
International Preliminary Report on Patentability issued in corresponding International Patent Application No. PCT/GB2022/050191 mailed Apr. 25, 2023 (10 pages).
Office Action issued in corresponding Chinese Patent Application No. 202280008301.1 issued Dec. 4, 2023 (with English translation)(10 pages).

* cited by examiner

FLEXIBLE LIQUID CRYSTAL-CONTAINING LENSES

This application claims the benefit under 35 U.S.C. § 119(e) of prior U.S. Provisional Patent Application No. 63/143,157, filed Jan. 29, 2021, which is incorporated in its entirety by reference herein.

BACKGROUND

Field

The present invention relates to electrically-switchable flexible liquid crystal lenses and liquid crystal cells for such lenses, such as flexible contact lenses that include a flexible liquid crystal cell or cells.

Description of Related Art

Soft contact lenses comprising electrically-switchable liquid crystal are known. The liquid crystal is typically retained in a liquid crystal cell in a cavity. When the contact lens is placed on the cornea of a wearer, the posterior surface of the contact lens conforms to the shape of the cornea, which results in distortion of the liquid crystal cell. The distortion can be exacerbated by gravity and eye-lid pressure when liquid crystal containing soft contact lenses are located on an eye. Such distortion is undesirable because it negatively affects the optical properties of the contact lens, such as by causing blurry vision or by increasing optical aberrations of the contact lens.

It is desirable to provide a soft contact lens that has a liquid crystal optic component and that inhibits the distortion of the liquid crystal cell and/or reduces the effect of distortion of the liquid crystal cell on optical performance of the contact lens.

SUMMARY

The present invention provides, according to a first aspect, an electrically-switchable flexible ophthalmic lens for conforming to the eye of a user, the lens comprising: a liquid crystal cell for changing at least one optical characteristic of the ophthalmic lens, and having a cell gap thickness between a first inner surface and a second inner surface with liquid crystal therebetween, and comprising: one or more support members, wherein each support member is arranged to maintain the cell gap thickness by providing support at one or more support locations within the cell, wherein the support members are arranged such that the support locations form one or more rings concentric with a centre of the liquid crystal cell.

The applicant has surprisingly discovered that the provision of support locations in the form of a ring is particularly effective at maintaining the cell spacing, even in the event that the liquid crystal cell is subject to a deforming force such as occurs when the lens is placed onto the cornea of a wearer.

Optionally, substantially all of the support members are arranged such that the support locations form one or more rings. In this case, there may be substantially no support locations that do not form one of the rings, but there may be a perimeter support as mentioned below.

Those skilled in the art will realise that "ring" does not mean that the ring is perfectly circular. In this connection, each of the support locations forming a respective ring may be within 30% of the mean distance between the centre of the liquid crystal cell and the support locations forming the ring. Each of the support locations forming a respective ring may optionally be within 25% of the mean distance between the centre of the liquid crystal cell and the support locations forming the ring, and optionally within 20%, optionally within 15%, optionally within 10% and optionally within 5% of the mean distance between the centre of the liquid crystal cell and the support locations forming the ring.

If the support locations form one (and only one) ring then optionally the mean distance between the centre of the liquid crystal cell and the support locations forming the ring is approximately the same as or optionally less than the closest distance between the support locations forming the ring and the perimeter support configuration.

The liquid crystal cell optionally comprises a perimeter support configuration to maintain a perimeter gap thickness at a perimeter of the liquid crystal cell.

The liquid crystal cell optionally has a half-width, w. The half width may be defined by the perimeter support configuration. Those skilled in the art will realise that the liquid crystal cell may be curved. In that case, the liquid crystal cell half-width may be measured along a chord. The liquid crystal cell may optionally comprise a disc, spherical cap or distorted spherical cap of liquid crystal. For example, the perimeter support configuration may optionally be in the form of a ring. For example, the perimeter support configuration may optionally be annular. In this case, the half-width may be the radius of the circle of liquid crystal. The half-width, w, may, for example, be a chord radius, for example, if the liquid crystal cell comprises a spherical cap or a distorted spherical cap of liquid crystal. Therefore, the liquid crystal cell may have a chord radius, w.

The support locations may optionally form one (and only one) ring. Each support location forming the ring may optionally be located from 0.30 w to 0.60 w from the centre of the liquid crystal cell, and optionally from 0.35 w to 0.50 w from the centre of the liquid crystal cell. The location of the support location may be determined using a chord measurement.

The support locations optionally form two or more rings concentric with a centre of the liquid crystal cell. If the support locations form two rings, then optionally the mean distance between the centre of the liquid crystal cell and the support locations forming the first, inner, ring is optionally approximately the same as the mean distance between the support locations forming the first ring and the support locations forming the second, outer, ring.

If the support locations form three or more rings, then the distance between adjacent rings may be approximately equal.

The support locations may optionally form two (and only two) rings. The support locations may optionally form three (and only three) rings.

As mentioned above, the support locations may form a first, inner, ring and a second, outer, ring. The mean distance of the support locations of the first ring from the centre of the liquid crystal cell may be denoted $d_1$. The mean distance of the support locations of the second ring from the centre of the liquid crystal cell may be denoted $d_2$. Optionally, the ratio $d_2:d_1$ may be at least 1.2:1, optionally at least 1.5:1, optionally at least 1.8:1 and optionally at least 2.0:1. The ratio $d_2:d_1$ may be no more than 3.0:1, optionally no more than 2.5:1, optionally no more than 2.0:1, optionally no more than 1.8:1 and optionally no more than 1.5:1. The ratio optionally may be from 1.2:1 to 3.0:1, optionally from 1.5:1 to 2.5:1 and optionally from 1.8:1 to 2.5:1. The distances of the support locations of the first and second rings from the centre of the liquid crystal cell may be chord measurements.

At least one, optionally more than one, and optionally each ring may be substantially annular. The annular support configuration may comprise an annular support member, the annular shape of the support member defining the annular shape of the support configuration. The annular support member may comprise two semi-annular support members, the two semi-annular support members being arranged to define the annular ring. The annular ring may be defined by a plurality of arcuate support members. The annular ring may be defined by a plurality of "point" support members (such as posts or spheres).

The support locations may optionally form a first ring and a second ring. Each support location forming the first ring may optionally be located from 0.16 w to 0.50 w from the centre of the liquid crystal cell, optionally from 0.24 w to 0.40 w from the centre of the liquid crystal cell and optionally from 0.26 w to 0.34 w from the centre of the liquid crystal cell. Each support location forming the second ring may optionally be located from 0.52 w to 0.80 w from the centre of the liquid crystal cell, optionally from 0.52 w to 0.75 w from the centre of the liquid crystal cell and optionally from 0.56 w to 0.70 w, and optionally from 0.60 w to 0.68 w from the centre of the liquid crystal cell.

Therefore, the support locations may form two rings concentric with a centre of the liquid crystal cell, the first ring located a chord measurement of 0.26-0.34 w from the centre of the liquid crystal cell and the second ring located a chord measurement of 0.52-0.70 w from the centre of the liquid crystal cell.

Each support member may be arranged to contact the first and second inner surfaces to maintain the cell gap thickness by providing support at a support location within the cell. In this case, the support members may be located between the first and second inner surfaces.

A centre of the liquid crystal cell, in plan view, may be the physical centre of the cell or may form a centre of the support configurations. The centre may be defined as an axis.

At least one, optionally more than one, and optionally each ring may be formed by more than one support member.

At least one, optionally more than one, and optionally each ring may be formed by three or more support members, optionally four or more, optionally six or more, optionally eight or more, optionally ten or more and optionally 12 or more support members.

If a ring is formed by more than one support member, the support members may optionally be spaced uniformly within the ring. For example, the distance between adjacent support members forming a respective ring may be approximately the same.

Each support member may have any suitable shape. For example, a support member may be a post, a sphere, a cylinder, an ellipsoid, an ovoid or arcuate.

A ring may comprise support members of mutually different shapes, but may optionally comprise support members of the same shape, and optionally of the same size.

If a support member is arcuate, then the arc may be a circular arc or a non-circular arc.

The angle of arc of an arcuate support member may be from 5 degrees to 360 degrees, typically depending on the number of support members that make-up a respective support configuration. For example, if a respective ring is formed by 6 or more arcuate support members, the angle of arc of each support member may optionally be from 5 degrees to 30 degrees, optionally from 5 degrees to 20 degrees and optionally from 5 degrees to 10 degrees. If a ring is formed by a single (i.e. one and only one) arcuate support member, the angle of arc may optionally be at least 240 degrees, optionally at least 300 degrees and optionally from 330 to 360 degrees. If a ring is formed by two (and only two) arcuate support members, then the angle of arc of each arcuate support members may optionally be from 120 to 180 degrees. A support member may be provided with one or more recess or aperture for the passage of liquid crystal therepast or therethrough. For example, if a support member is elongate, such as may be the case if the support member is semi-annular, or if the support member is annular, then in the absence of any such recess or aperture, the support member may provide a barrier to the flow of liquid crystal, which, in certain circumstances, may be undesirable. A support member may be provided with a plurality of recesses or apertures for the passage of liquid crystal therepast or therethrough.

The one or more support members may comprise a polymer, such as polydimethylsiloxane (PDMS). The one or more support members may comprise a material having a Young's modulus of from 100 to 5000 kPa, optionally of from 200 to 2000 kPa and optionally of from 200 to 1000 kPa.

The cell gap thickness may be substantially the same across the liquid crystal cell when the lens is undeformed. Alternatively, the cell gap thickness may not be the same across the liquid crystal cell when the lens is undeformed. In this case, the cell gap thickness will depend on position within the liquid crystal cell. For example, if the ophthalmic lens comprises a so-called meniscus lens, then one of the first and second inner surfaces is typically convex and the other concave, the cell gap thickness at any point in the liquid crystal cell being determined by the curvature of the convex and concave surfaces. For example, if the liquid crystal cell comprises a Fresnel lens structure, the cell gap thickness at a particular point in the liquid crystal cell may depend on the height of the Fresnel lens structure at that point in the cell.

The maximum cell gap thickness (the largest spacing between first inner surface and second inner surface in the undeformed cell) may optionally be at least 2 μm, optionally at least 5 μm, optionally at least 10 μm, optionally at least 15 μm and optionally at least 20 μm. The maximum cell gap thickness may optionally be no more than 200 μm, optionally no more than 150 μm, optionally no more than 100 μm, optionally no more than 75 μm and optionally no more than 50 μm. The maximum cell gap thickness may optionally be from 10 μm to 100 μm and optionally from 20 μm to 75 μm.

The greatest dimension, such as a width or diameter (chord diameter), of the liquid crystal cell may optionally be no more than 20 mm, optionally no more than 15 mm, optionally no more than 12 mm, optionally no more than 10 mm, optionally no more than 8 mm, optionally no more than 6 mm and optionally no more than 4 mm. The greatest dimension of the liquid crystal cell may optionally be at least 3 mm, optionally at least 5 mm and optionally at least 7 mm.

The greatest dimension, such as the width or diameter (chord diameter), of the ophthalmic lens may optionally be no more than 20 mm, optionally no more than 18 mm, optionally no more than 16 mm, optionally no more than 14 mm, optionally no more than 12 mm and optionally no more than 10 mm. The greatest dimension of the ophthalmic lens may optionally be at least 6 mm, optionally at least 8 mm, optionally at least 10 mm and optionally at least 12 mm. In some embodiments, the diameter of the ophthalmic lens is between 10 mm and 16 mm.

At least one, and optionally each, of the first inner surface and the second inner surface are optionally provided with one or more surface treatments for aligning the liquid crystal. For example, the one or more surface treatments may comprise one or more alignment layers. At least one, and optionally each, alignment layer may comprise a polymer, such as an organic polymer, or an evaporated inorganic material, such as silicon oxide. Such polymers may have been at least partially oriented by applying a shear force to the surface of the polymer, for example, by brushing the surface of the polymer. Such polymers typically cause the liquid crystal to adopt a particular and desired orientation. For example, the director of the liquid crystal adjacent to the polymer may have a preferred in-plane orientation. Furthermore, the liquid crystal may have a low pre-tilt close to the polymer (for example, no more than 10°, optionally no more than 50 and optionally no more than 30). One or more surface treatments may orient the liquid crystal in a high pre-tilt orientation (for example, a pre-tilt of no less than 60°, optionally no less than 70°, optionally no less than 800 and optionally no less than 85°). The surface treatment may orient the liquid crystal in a substantially homeotropic alignment, with the director substantially perpendicular to the first and second inner surfaces.

The surface treatments on the first and second inner surface are typically chosen to confer a particular alignment on the liquid crystal. For example, the surface treatment of the first surface and second surface may be arranged so that the liquid crystal is in a twisted nematic arrangement.

The liquid crystal cell may comprise a first substrate and a second substrate for providing support to the liquid crystal cell. The first and second substrates are typically flexible. The liquid crystal cell may be flexible.

One or both of the first and second substrates may be provided with an electrically-conductive layer for addressing the liquid crystal in the cell. The electrically-conductive layer may comprise any suitable electrically-conductive material, such as indium-tin oxide (ITO). The electrically-conductive layer is typically suitably transparent to allow the lens to function as a lens. A non-conductive layer may be provided over the respective electrically-conductive layer. The non-conductive layer may be located between an electrically-conductive layer and the respective surface treatment for aligning the liquid crystal (such as an alignment layer).

The liquid crystal may be any suitable liquid crystal such as those well-known to those skilled in the art, such as E7 from Merck.

The liquid crystal may optionally be in the nematic liquid crystal phase at typical operating temperatures, for example, at 25° C. The liquid crystal may optionally be in the nematic phase from 10° C. to 40° C. and optionally from −5° C. to 50° C.

Those skilled in the art will realise that a liquid crystal phase other than the nematic phase may be used. For example, the liquid crystal may be in a smectic phase at typical operating temperatures.

The perimeter gap thickness may optionally be approximately the same as the maximum cell gap thickness, although this will depend on the nature of the ophthalmic lens.

Alternatively, the maximum cell gap thickness may be less than the perimeter gap thickness. This may be the case, for example, if the cell comprises a second layer of liquid crystal in addition to that between the first and second inner surfaces. In this connection, the liquid crystal cell may have a cell spacing between a third inner surface and a fourth inner surface with liquid crystal therebetween, the liquid crystal between the third and fourth inner surfaces being in substantially the same optic path as the liquid crystal between the first and second inner surfaces. The liquid crystal cell may comprise one or more spacers for maintaining the cell spacing between the third inner surface and the fourth inner surface. Optionally, each spacer is arranged to maintain the cell spacing by providing support at a support location within the cell. The one or more of the spacers may be arranged in a similar manner to the support members between the first and second inner surfaces. In this connection, substantially all of the spacers may be arranged so that the support locations form one or more rings concentric with a centre of the liquid crystal cell. For the avoidance of doubt, the cell spacing may be substantially the same across the liquid crystal cell. Alternatively, the cell spacing may not be the same across the liquid crystal cell. In this case, the cell spacing will depend on the position within the liquid crystal cell. For example, if the ophthalmic lens comprises a so-called meniscus lens, then one of the third and fourth inner surfaces is typically convex and the other concave, the cell spacing at any point in the liquid crystal cell being determined by the curvature of the convex and concave surfaces. For example, if the liquid crystal cell comprises a Fresnel lens structure, the cell spacing at a particular point in the liquid crystal cell may depend on the height of the Fresnel lens structure at that point in the cell.

Each spacer may contact the third and fourth inner surfaces to maintain the cell spacing.

The one or more rings may have those features described above in relation to the one or more rings used to maintain the cell gap thickness between the first and second inner surfaces.

The one or more spacers may have those features described above in relation to the one or more support members used to maintain the cell gap thickness between the first and second inner surfaces.

The ophthalmic lens may comprise any suitable arrangement for providing the desired optical effect. For example, the ophthalmic lens may comprise a Fresnel lens structure. Such a Fresnel lens structure may define the shape of one of the first and second surfaces. The liquid crystal disposed between the first and second surfaces may be switchable between a first and a second liquid crystal configuration, the difference in the refractive index between the liquid crystal and the material forming the Fresnel lens structure being less in one of the first and second liquid crystal configuration than in the other of the first and second liquid crystal configuration. In one of the first and second liquid crystal configurations, the difference in the refractive index between the liquid crystal and the material forming the Fresnel lens may be small such that the refractive index of the liquid crystal "matches" that of the material forming the Fresnel lens. Therefore, in one of the liquid crystal configurations (the one in which the refractive indices of the Fresnel lens material and the liquid crystal are not matched) the Fresnel lens refracts light as a lens, and in the other of the liquid crystal configuration (the one in which the refractive indices of the Fresnel lens material and the liquid crystal are "matched"), the Fresnel lens does not refract light as a lens, or refracts light significantly less.

The height of any support member will depend on the geometry of the Fresnel lens structure and the location of a support member relative to the Fresnel lens. For example, if a support member is located on a Fresnel lens crest or peak, then the height of the support member may typically be smaller than if the support member were to be located in a trough of a Fresnel lens structure.

The ophthalmic lens may comprise a meniscus lens, for example. One of the first and second surfaces is a convex surface and the other of the first and second surfaces is a concave surface. The curvatures of the first and second surfaces may be the same or different. For example, the curvature of the convex surface may be greater or lower than that of the concave surface. The cell gap thickness in such a meniscus lens is optionally different depending on the position within the liquid crystal cell. For example, in the centre of the meniscus lens, the cell gap thickness in the centre of the lens may be greater than at the periphery of the lens. Alternatively, the cell gap thickness at the periphery of the lens may be greater than at the centre of the lens. The heights of the support members would be selected to maintain those cell gap thicknesses. The ophthalmic lens may comprise more than one meniscus lens. For example, the ophthalmic lens may comprise a first meniscus lens, and a second meniscus lens arranged in the same optical path as the first meniscus lens.

The ophthalmic lens may comprise a gradient-index (GRIN) lens, for example. A GRIN lens comprises a lens in which the refractive index of the liquid crystal depends on the lateral position across the liquid crystal cell. The variation in refractive index across the liquid crystal cell is typically achieved by virtue of the liquid crystal molecules having different orientations at different positions across the liquid crystal cell. This is optionally achieved using different surface treatments of the first and/or second surfaces in different regions of the liquid crystal cell to achieve different pretilts of the liquid crystal molecules at and adjacent the first or second surfaces. In a GRIN lens, the cell spacing between the first and second surfaces may be substantially the same across the liquid crystal cell. Alternatively, the cell spacing not be substantially the same across the liquid crystal cell. When a switching voltage is applied, the orientation of at least some of the liquid crystal molecules in the GRIN cell will change, thereby changing the refractive index of the liquid crystal associated with the change of orientation. The ophthalmic lens may comprise more than one GRIN lens. For example, the ophthalmic lens may comprise a first GRIN lens, and a second GRIN lens arranged in the same optical path as the first GRIN lens.

The ophthalmic lens may be a contact lens.

The liquid crystal cell is provided for changing at least one optical characteristic of the ophthalmic lens, such as the focal length of the ophthalmic lens.

As mentioned above, the one or more support members are used to maintain a cell gap thickness. In order to do this, the one or more support members are typically attached to another part of the liquid crystal cell. For example, adhesive may be used to attach the one or more support members to another part of the liquid crystal cell. For example, adhesive may be used to attach one or more support members to one or both of the first and second inner surfaces.

As mentioned above, each support member is arranged to maintain a cell gap thickness. The maintenance of cell gap thickness is important to maintaining the optical properties of the ophthalmic lens. In this connection, the mean change in cell gap thickness across the liquid crystal cell may optionally be no more than 15%, optionally no more than 12%, optionally no more than 10%, optionally no more than 8% and optionally no more than 5% when the ophthalmic lens is deformed by being placed on the eye of a user.

In accordance with a second aspect of the present invention, there is provided a flexible liquid crystal cell suitable for the lens in accordance with the first aspect of the present invention.

There is therefore provided a liquid crystal cell for changing at least one optical characteristic of an ophthalmic lens, and having a cell gap thickness between a first inner surface and a second inner surface, and comprising: one or more support members, wherein each support member is arranged to maintain the cell gap thickness by providing support at one or more support locations within the cell, wherein the support members (and optionally all of the support members) are arranged such that the support locations form one or more rings concentric with a centre of the liquid crystal cell.

The liquid crystal cell may therefore have the features described above in relation to the lens of the first aspect of the present invention.

In accordance with a third aspect of the present invention, there is provided an electrically-switchable flexible ophthalmic lens comprising a liquid crystal cell for changing at least one optical characteristic of the ophthalmic lens, and having a cell gap thickness between a first inner surface and a second inner surface, and comprising: a plurality of support members, wherein each support member is arranged to maintain the cell gap thickness by providing support at one or more support locations within the cell, wherein the support members (and optionally all the support members) are arranged such that the support locations form two annular rings concentric with a centre of the liquid crystal cell.

The applicant has surprisingly discovered that the provision of support members that provide support locations in the form of two annular rings is particularly effective at reducing the deterioration of lens performance when the lens is placed on the cornea of a wearer. For the avoidance of doubt, there are substantially no support members that provide support locations outside the annular rings.

The liquid crystal cell optionally comprises a perimeter support configuration to maintain the cell gap thickness at a perimeter of the liquid crystal cell.

The lens may be a contact lens.

The lens of the third aspect of the present invention may comprise the features of the lens of the first aspect of the present invention and/or the liquid crystal cell of the second aspect of the present invention.

In accordance with a fourth aspect of the present invention, there is provided a liquid crystal cell suitable for the lens in accordance with the third aspect of the present invention. In accordance with a fourth aspect of the present invention, there is therefore provided a liquid crystal cell for changing at least one optical characteristic, such as refractive power, of an ophthalmic lens, and having a cell gap thickness between a first inner surface and a second inner surface, and comprising: a plurality of support members, wherein each support member is arranged to maintain the cell gap thickness by providing support at one or more support locations within the cell, wherein the support members (and optionally all of the support members) are arranged such that the support locations form two annular rings concentric with a centre of the liquid crystal cell.

The liquid crystal cell of the fourth aspect of the present invention may comprise those features described above in relation to the first, second and third aspects of the present invention.

In accordance with a fifth aspect of the present invention, there is provided an electrically-switchable flexible ophthalmic lens comprising
a liquid crystal cell for changing at least one optical characteristic of the ophthalmic lens, and having a cell gap thickness between a first inner surface and a second inner surface,
the liquid crystal cell comprising one or more arcuate support members for helping to maintain the cell gap thickness.

The applicant has discovered that a cell gap thickness in a liquid crystal cell in a flexible lens may be maintained using an arcuate support member. Furthermore, such arcuate support members may be used to define a ring of support locations within a liquid crystal cell which has proved to be useful in reducing the deleterious effects associated with cell deformation when a lens is placed on the eye of a wearer. The arc of an arcuate support member may be a circular arc or a non-circular arc.

The angle of arc of an arcuate support member may be from 5 degrees to 360 degrees. For example if a plurality of support members are used in combination to define a ring of support locations in the liquid crystal cell, then the angle of the arc may optionally depend on the number of support members that form said ring. For example, if a respective ring is formed by 6 or more arcuate support members, the angle of arc of each support member may optionally be from 5 degrees to 30 degrees, optionally from 5 degrees to 20 degrees and optionally from 5 degrees to 10 degrees. If a ring is formed by a single (i.e. one and only one) arcuate support member, the angle of arc may optionally be at least 240 degrees, optionally at least 300 degrees and optionally from 330 to 360 degrees. If a ring is formed by two (and only two) arcuate support members, then the angle of arc of each arcuate support members may be from 120 to 180 degrees.

One or more of the arcuate support members may be provided with one or more recesses or apertures for the passage of liquid crystal therepast or therethrough. For example, if a support member is elongate, such as may be the case if the support member is semi-annular, or if the support member is annular, then in the absence of any such recess or aperture, the support member may provide a barrier to the flow of liquid crystal which, in certain circumstances, may be undesirable. A support member may be provided with a plurality of recesses or apertures for the passage of liquid crystal therepast or therethrough.

The lens may be a contact lens.

The lens of the fifth aspect of the present invention may comprise one or more features of the first to fourth aspects of the present invention.

The present invention further provides a liquid crystal cell for use in the lens of the fifth aspect of the present invention. In accordance with a sixth aspect of the present invention, there is therefore provided a liquid crystal cell having a cell gap thickness between a first inner surface and a second inner surface, the liquid crystal cell comprising one or more arcuate support members for helping to maintain the cell gap thickness.

The liquid crystal cell of the sixth aspect of the present invention may comprise one or more features of the first to fifth aspects of the present invention.

In accordance with the following clauses there is also provided:

Clause A—An electrically-switchable flexible ophthalmic lens for conforming to the eye of a user, the lens comprising:
a liquid crystal cell for changing at least one optical characteristic of the ophthalmic lens, and having a cell gap thickness between a first inner surface and a second inner surface with liquid crystal therebetween, the flexible liquid crystal cell having a chord radius, w, and comprising:
a plurality of support members, wherein each support member is arranged to maintain the cell gap thickness by providing support at one or more support locations within the cell,
wherein the support members are arranged such that the support locations form two rings concentric with a centre of the liquid crystal cell, the first ring located a chord measurement of 0.26-0.34 w from the centre of the liquid crystal cell and the second ring located a chord measurement of 0.52-0.70 w from the centre of the liquid crystal cell.

Clause B—A lens according to clause A, wherein the first ring is located a chord measurement of 0.30-0.34 w from the centre of the liquid crystal cell.

Clause C—A lens according to clause A or clause B, wherein the second ring is located a chord measurement of 0.56-0.70 w from the centre of the liquid crystal cell.

Clause D—A lens according to any of clauses A to C, wherein the support locations form two (and only two) rings.

Clause E—A lens according to any of clauses A to D, wherein the first ring and the second ring are each formed by more than support member.

Clause F—A lens according to clause E, wherein the distance between adjacent support members forming a respective ring is approximately the same.

Clause G—A lens according to any of clauses A to F, wherein one or more of the support members is a post, a sphere, a cylinder, an ellipsoid, an ovoid, elongate, annular, hemi-annular or arcuate.

Clause H—A lens according to any of clauses A to G, wherein the cell gap thickness is substantially the same across the liquid crystal cell.

Clause I—A lens according to any of clauses A to G, wherein the cell gap thickness is not the same across the liquid crystal cell.

Clause J—A lens according to any of clauses A to I, wherein the liquid crystal cell comprises a perimeter support configuration to maintain a perimeter gap thickness at a perimeter of the liquid crystal cell.

Clause K—A lens according to any of clauses A to J, wherein substantially all of the support members are arranged such that the support locations form two rings, there being substantially no support members outside of the rings.

Clause L—A lens according to any of clauses A to K, wherein the liquid crystal cell has a cell spacing between a third inner surface and a fourth inner surface with liquid crystal therebetween, the liquid crystal between the third and fourth inner surfaces being in substantially the same optic path as the liquid crystal between the first and second inner surfaces.

Clause M—A lens according to clause L, wherein the liquid crystal cell comprises one or more spacers for maintaining the cell spacing between the third inner surface and the fourth inner surface.

Clause N—A lens according to clause M, wherein substantially all of the spacers are arranged so that the support locations form one or more rings, and optionally two rings, and optionally only two rings, concentric with a centre of the liquid crystal cell.

Clause O—A lens according to any of clauses A to N comprising a Fresnel lens structure, wherein the Fresnel lens structure optionally defines the shape of one of the first and second surfaces, in which the liquid crystal disposed between the first and second surfaces is optionally switchable between a first and a second liquid crystal configuration, the difference in the refractive index between the liquid crystal and the material forming the Fresnel lens structure being less in one of the first and second liquid crystal configuration than in the other of the first and second liquid crystal configuration.

Clause P—A lens according to any of clauses A to N comprising a meniscus lens, wherein one of the first and second surfaces is a convex surface and the other of the first and second surfaces is a concave surface, the curvatures of the first and second surfaces being the same or different.

Clause Q—A lens according to any of clauses A to N comprising a gradient-index (GRIN) lens.

It will, of course, be appreciated that features described in relation to one aspect of the present invention may be incorporated into other aspects of the present invention. For example, the lens of the first aspect of the present invention may incorporate any of the features described with reference to the lens of the fifth aspect of the present invention and vice versa.

DESCRIPTION OF THE DRAWINGS

Embodiments of the present invention will now be described by way of example only with reference to the accompanying schematic drawings of which.

DETAILED DESCRIPTION

Figure 1A:
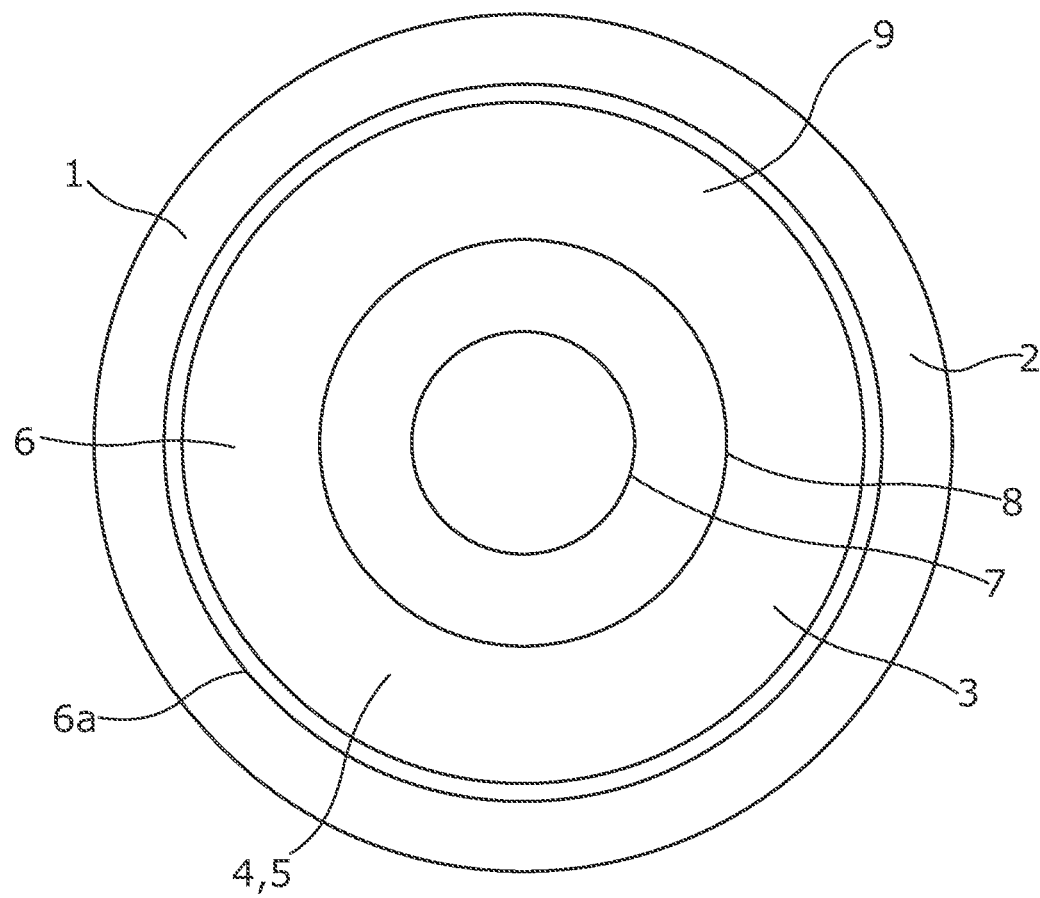
FIG. 1A shows a schematic plan view of an example of a flexible electrically-switchable ophthalmic lens according to a first embodiment of the invention.
Figure 1B:
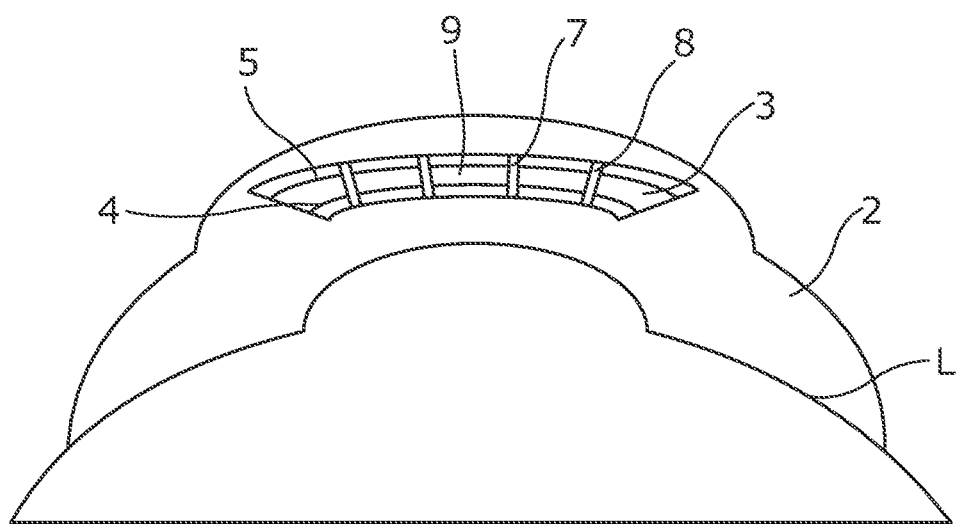
FIG. 1B shows a schematic cross-sectional view of the lens of FIG. 1A in place on the eye of a wearer.
Figure 2A:
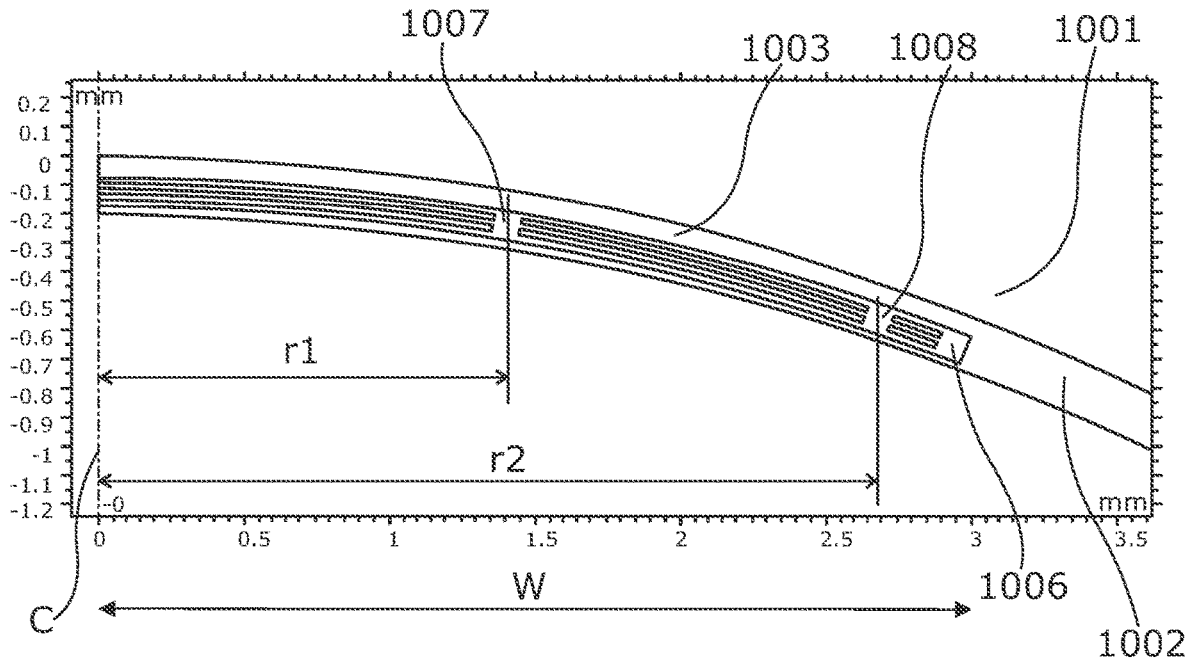
FIG. 2A shows a cross-section through part of another example of a flexible electrically-switchable lens according to a second embodiment of the invention.

An example of a flexible lens in accordance with the present invention is shown schematically in FIGS. 1A and 1B. FIG. 1A shows a schematic plan view of the lens and FIG. 1B shows a schematic cross-sectional view of the lens when situated on the cornea of a wearer. The electrically-switchable flexible ophthalmic lens 1 comprises a flexible liquid crystal cell 3 embedded within a lens body 2. The lens body 2 has a shape typical of a soft contact lens. In the present case, the ophthalmic lens is a soft contact lens. The liquid crystal cell 3 has a cell gap thickness between a first inner surface 4 and a second inner surface 5 with liquid crystal 9 therebetween. The liquid crystal cell 3 is generally circular in shape, in plan view, such as in FIG. 1A, and includes a chord radius, w (as shown in FIG. 2A). The lens body 2 comprises silicone. The lens body may be comprise a hydrogel, a silicone hydrogel or a silicone elastomer. The liquid crystal cell 3 comprises a perimeter support configuration 6 to maintain a perimeter gap thickness at a perimeter of the liquid crystal cell. The perimeter support configuration 6 comprises an annular strip 6a of spacer sheet (e.g. Mylar®) of 50 microns thickness. The liquid crystal cell 3 comprises two support members, in the form of two annular supports 7, 8 that are arranged to maintain the cell gap thickness by providing support at support locations within the cell. The support locations provided by the two annular support members 7, 8 form two rings concentric with a centre of the liquid crystal cell 3. The first annular support member 7 is located at a chord measurement of 0.26-0.34 w from the centre of the liquid crystal cell and the second annular support member 8 is located at a chord measurement of 0.52-0.70 w from the centre of the liquid crystal cell. The annular supports 7, 8 may be made by any suitable method, for example, by using a source of suitable radiation (typically UV radiation) and a mask to control exposure of a radiation-sensitive material (such as a photopolymer).

A cross-sectional view of the lens can be seen in FIG. 1B. The lower surface L of the lens 1 conforms to the shape of the underlying eye, including the cornea. This causes deformation of the lens 1, and thus causes deformation forces to be applied to the liquid crystal cell 3. The use of two spaced annular support members 7, 8 has proved to be particularly effective at reducing unwanted distortion of the liquid crystal cell 3 and unwanted changes in thickness of the liquid crystal layer when the lens is placed on the cornea of a wearer.

It is worth noting that the first inner 4 and second inner 5 surfaces are spaced apart by the perimeter support 6 and the two annular support members 7, 8. There are substantially no other spacers or support members that space-apart the first 4 and second 5 inner surfaces. Apart from the support at the perimeter of the liquid crystal cell, all of the support locations are located in the shape of two rings formed by the two annular support members 7, 8.

The first 4 and second 5 inner surfaces of the liquid crystal cell are provided with alignment polymers (not shown in FIG. 1, but discussed below in relation to FIG. 4) to confer alignment on the liquid crystal 9 so that the liquid crystal cell 3 has the desired optical properties for lens 1. Electrically-conductive layers (also not shown in FIG. 1, but discussed below in relation to FIG. 4) are also provided to enable switching of the liquid crystal 9.

Figure 2B:
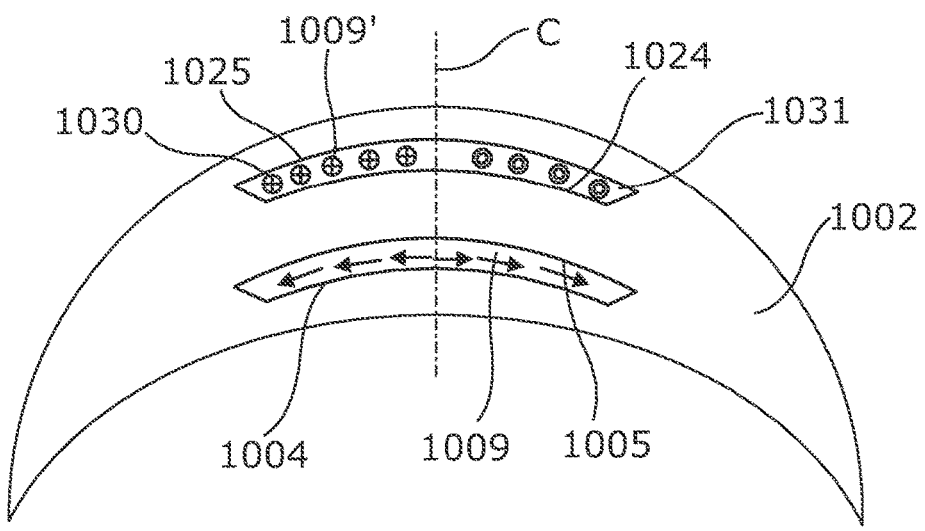
FIG. 2B shows a schematic cross-section through the lens of FIG. 2A.

A further example of a flexible lens in accordance with the present invention will now be described with reference to FIGS. 2A and 2B. FIG. 2A is a schematic cross-section through part of lens 1001 showing the positions of the support members that act to inhibit deformation of the liquid crystal cell. FIG. 2B is a schematic cross-section through lens 1001 showing the arrangement of liquid crystal in the lens. Lens 1001 is similar to that of lens 1 of FIG. 1A in that the lens 1001 comprises a liquid crystal cell 1003 embedded within a lens body 1002. The lens body 1002 has a shape typical of a soft contact lens. The liquid crystal cell 1003 is generally circular in shape, like the liquid crystal cell of FIG. 1A. Furthermore, as in the lens of FIG. 1A, the liquid crystal cell 1003 is provided with two annular support members 1007, 1008. The two annular support members 1007, 1008 are arranged to maintain the cell gap thickness between first 1004 and second 1005 inner surfaces by providing support at support locations within the cell. The support locations provided by the two annular support members 1007, 1008 form two rings concentric with a centre of the liquid crystal cell 1003, the centre being denoted by axis C. The ring formed by support member 1007 has a chord radius, r1, and the ring formed by support member 1008 has a chord radius r2. As shown in FIG. 2A, r1 is about 0.3 w, where w is the distance from the centre of the cell, C, to the edge of the liquid crystal cell, and r2 is about 0.85 w. As in the lens of FIGS. 1A and 1, the lens 1001 of FIGS. 2A and 2B is provided with a perimeter support arrangement 1006. In this case, the perimeter support arrangement 1006 comprises an annular perimeter of polymer having a Young's modulus of 500 kPa. Support members 1007, 1008 are also provided by a polymer having a Young's modulus of 500 kPa.

The lens of FIGS. 2A and 2B does differ in some material ways to the lens of FIGS. 1A and 1B, however. Whereas the liquid crystal cell of FIGS. 1A and 1B comprises one layer of liquid crystal, the liquid crystal cell 1003 of FIGS. 2A and 2B comprises two layers of liquid crystal 1009, 1009', each in the same optic path. Liquid crystal 1009 is located between first 1004 and second 1005 inner surfaces, each of which is provided with alignment surfaces (not shown) that cause the liquid crystal molecules to align radially outwards from centre C, substantially parallel to inner surfaces 1004, 1005 (though the molecules may have a small pre-tilt near the inner surfaces 1004, 1005). The arrows show the approximate alignment of the liquid crystal molecules. Liquid crystal 1009' is located between third 1024 and fourth 1025 inner surfaces. The third 1024 and fourth 1025 inner surfaces are provided with an alignment polymer (not shown) that has been brushed to align the liquid crystal molecules out of the plane of the figure. The alignment polymers in the left 1030 and right 1031 parts have been brushed in different directions to provide a pre-tilt in different directions in the left 1030 and right 1031 parts.

Electrically-conductive layers (not shown) are also provided to enable switching of the liquid crystal 1009 and 1009'.

The applicant has investigated how the number and position of annular support members affects the performance of the lens when it is placed on a cornea of a wearer. In this connection, the applicant has discovered that the use of two supporting annular members has proved to be preferable to the use of one (and only one) supporting member.

The applicant has modelled the behaviour of the liquid crystal cell as shown in FIGS. 2A and 2B to determine the optimum position of two annular support members, when the lens is deformed as it would be on the cornea of a wearer, taking into account the optical performance of the liquid crystal cell in an unswitched and switched state, using radially polarised light and circumferentially polarised light. In this connection, various parameters of the lens are as follows: 14 mm diameter lens, radius of curvature of top lens surface—8.4 mm, radius of curvature of bottom lens surface—8.6 mm, 0.2 mm thick lens made from PDMS having a modulus of 500 kPa, half-width, w, of liquid crystal cell—3 mm; thickness of liquid crystal 1009—15 microns; thickness of liquid crystal 1009'—15 microns; radius of curvature of liquid crystal cell—8.4 mm; $n_e$ (extraordinary refractive index)—1.9; $n_o$ (ordinary refractive index)—1.5.

The unswitched state corresponded to the application of no switching voltage. The switched state corresponded to a fully switched state in which the director of the liquid crystal is substantially parallel to the applied electric field.

The optical power of the liquid crystal cell as described above was investigated thus. The shape of the cornea's surface was defined as being the best $6^{th}$ order fit as defined in Lee et al., BMC Ophthalmology, 2016, 16:176. The bottom or posterior surface of the contact lens conforms to the cornea's surface, causing deformation of the liquid crystal cell. The position of the inner annular support, r1, was fixed at a value of between 0 w and 0.45 w, w being the chord radius of the liquid crystal cell, measured as shown in FIG. 2A. For each such fixed position of the inner annular support, r1, the position of the outer annular support, r2, was varied between 0.50 w and 0.90 w. For the avoidance of doubt, r1 and r2 are chord measurements. For each position of the inner annular support and the outer annular support, the optical power of the liquid crystal cell was simulated, in both a switched and unswitched state, for radially polarised and circumferentially polarised light. The variation in optical power across the liquid crystal cell was simulated, with a desire to minimise the variation in optical power across the liquid crystal cell for both radially and circumferentially polarised light, and with a desire to minimise the difference in optical power for radially polarised light and circumferentially polarised light.

Figure 6A:
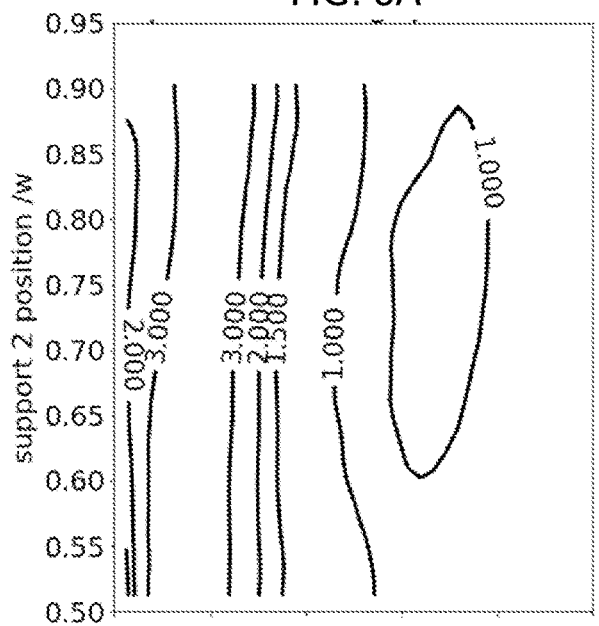
FIG. 6A-D show how the simulated range of deviation of optical power, resulting from the lens deformation, varies as a function of the position of two annular support members in the lens for four cases representing all four combinations of two conditions: for the light polarised along or normal to the radius (circumferentially) and the liquid crystal in the powered or non-powered state.
Figure 6B:
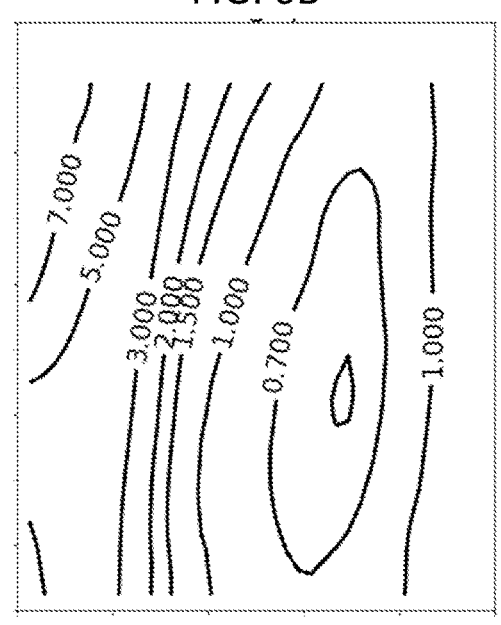
Figure 6C:
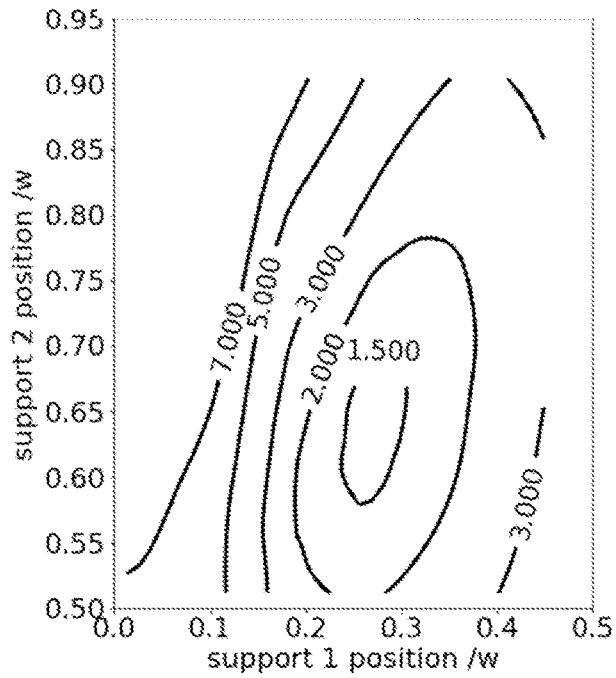
Figure 6D:
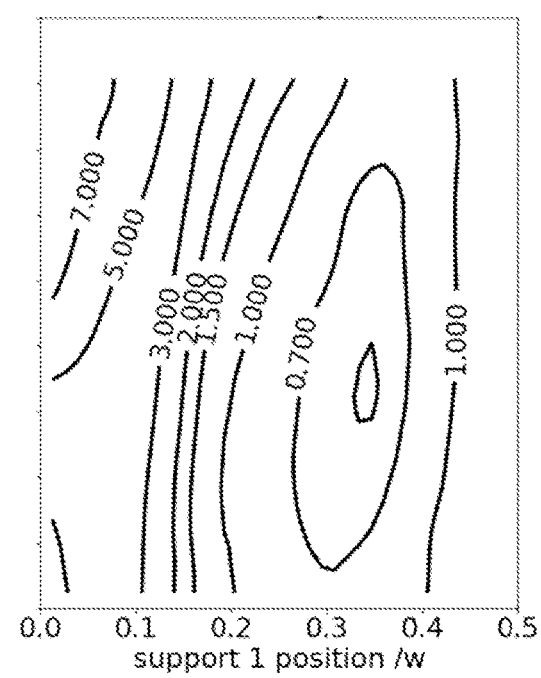

FIGS. 6A-D show the simulated optical power range (i.e. the variation in optical power across the lens) as a function of the position of the inner annular support and the outer annular support for 4 combinations of 2 conditions: light polarised radially or circumferentially, and for powered or unpowered liquid crystal cell. FIG. 6A shows the variation in simulated optical power range using light polarised circumferentially, with an unpowered liquid crystal cell. FIG. 6B shows the variation in simulated optical power range using light polarised circumferentially, with a powered liquid crystal cell. FIG. 6C shows the variation in simulated optical power range using light polarised radially, with an unpowered liquid crystal cell. FIG. 6D shows the variation in simulated optical power range using light polarised radially, with a powered liquid crystal cell. In each of FIG. 6A-D, the position of the inner annular support is denoted on the x-axis as a function of the chord radius, w, of the liquid crystal cell. The position of the outer annular support is denoted on the y-axis, as a function of the chord radius, w, of the liquid crystal cell. FIG. 6A-D show that the optimum combination of the positions of the inner and outer annular supports for all 4 cases was surprisingly determined to be about 0.3 w for the inner support and about 0.6 w-0.7 w for the outer support. With the annular supports in the optimised positions, the variation in optical power across the liquid crystal cell was found to be of the order of about 1-2 D (see FIG. 7). In the absence of the annular supports, or with annular supports in different positions, it was found that the optical power range was higher and in some cases at least 4 D. In the absence of the annular supports, the centre of the liquid crystal cell was found to collapse, with the periphery of the liquid crystal cell bulging.

Figure 7A:
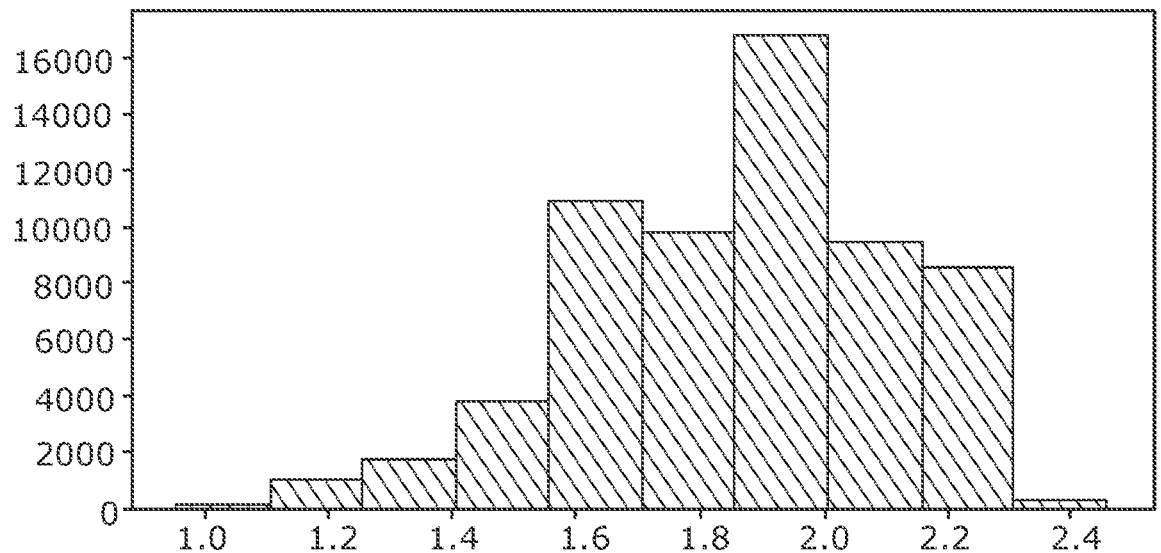
FIGS. 7A and 7B show simulated histograms of optical power for randomly polarised light for the lens where the positioning of two ring supports is selected from minimum deviation areas on FIG. 6 ($d_1$=0.31 and $d_2$=0.66)
Figure 7B:
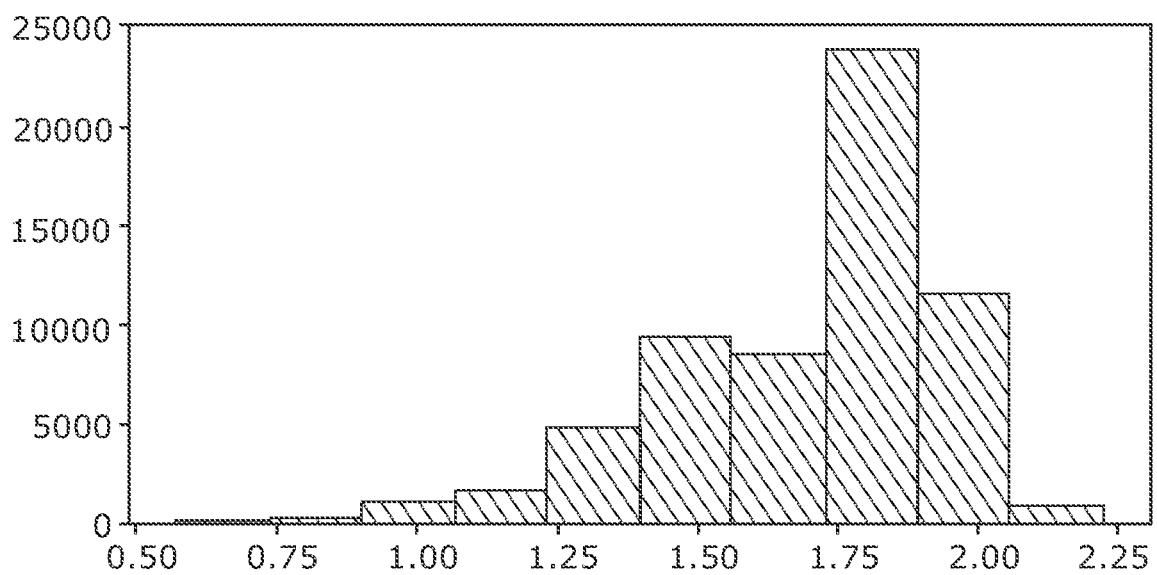

Further data showing the performance of the lens is shown in FIGS. 7A and 7B, which show optical power histograms in the powered (FIG. 7A) and unpowered (FIG. 7B) state for randomly polarised light. The x-axis shows the optical power in D, and the y-axis shows the number of uniformly distributed test rays, experiencing a range of optical power. A narrower histogram is desirable i.e. a greater proportion of the area of the lens being at the same power. The data show that the range of difference in power across the liquid crystal cell is small, with a 10-90% range of about 0.6 D.

In the liquid crystal cells of FIGS. 1A, 1B, 2A and 2B, each ring is formed by an annular support member. An annular support member 407 is also shown schematically in FIG. 3D. However, such an annular support member 407 does not permit flow of liquid crystal therepast or therethrough unless there is a recess or aperture therein, and it may be desirable to permit flow of liquid crystal within the liquid crystal cell. In this connection, the support arrangements shown in plan view in FIGS. 3A-C provide supporting ring arrangements but permit flow of liquid crystal.

Figure 3A:
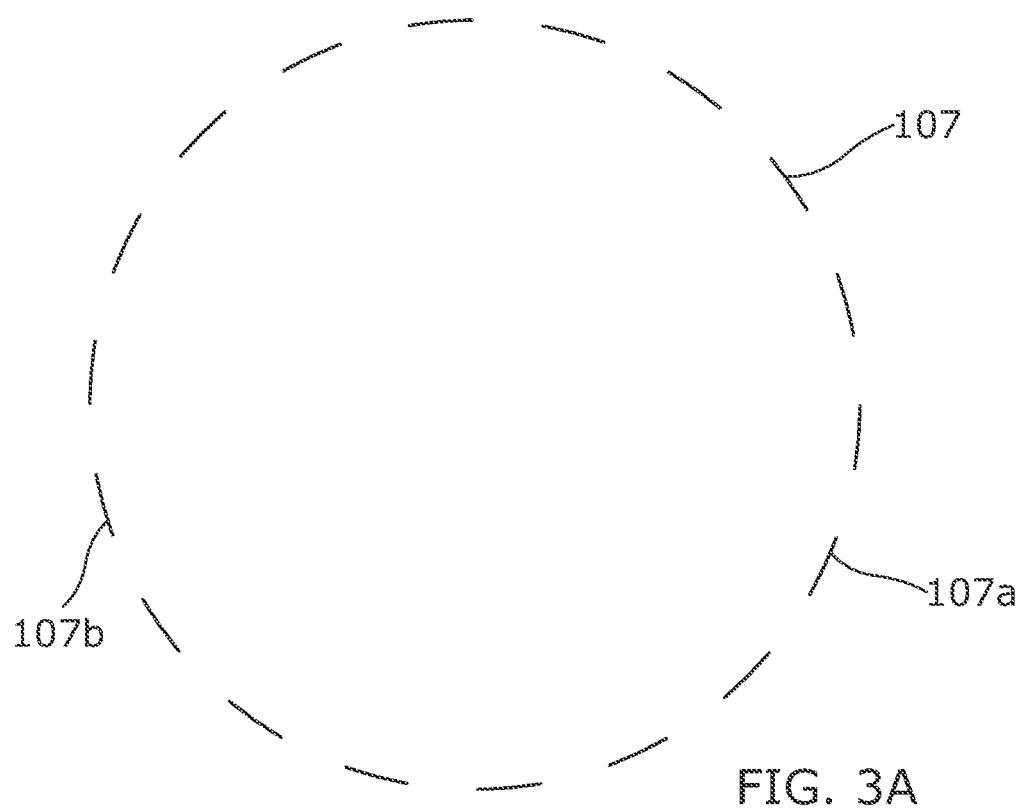
FIG. 3A shows a plan view of an example of a plurality of arcuate support members arranged to provide support locations in a ring shape for use in a lens according to another embodiment of the invention.

FIG. 3A shows a ring 107 formed from a plurality of arcuate posts, two of which are labelled 107a, 107b. Each arcuate post is a circular arc and has an arc angle of about 10°, and the arcuate posts are uniformly distributed about ring 107. There is a gap of about 100 between each arcuate post. The arcuate posts are provided between the first and second inner surfaces of the liquid crystal cell.

Figure 3B:
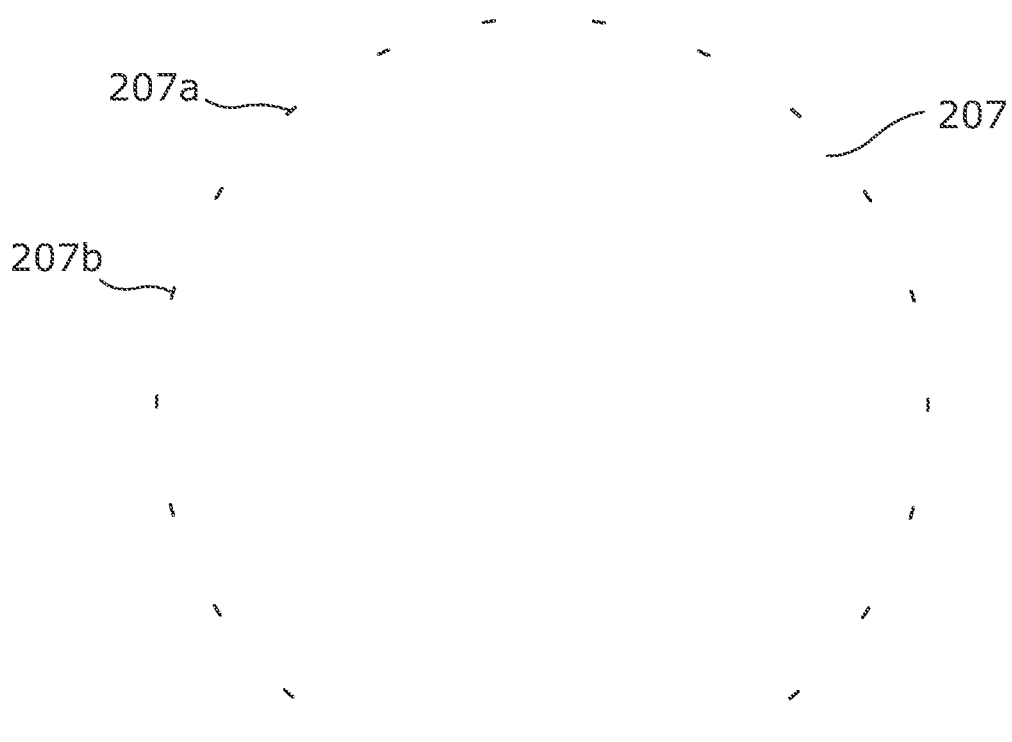
FIG. 3B shows a plan view of an example of a plurality of cylindrical support members arranged to provide support locations in a ring shape for use in a lens according to another embodiment of the invention.

FIG. 3B shows a ring 207 formed from a plurality of posts, two of which are labelled 207a, 207b. The posts are circular cylindrical is cross-section. Once again, the arcuate posts are provided between the first and second inner surfaces of the liquid crystal cell.

Figure 3C:
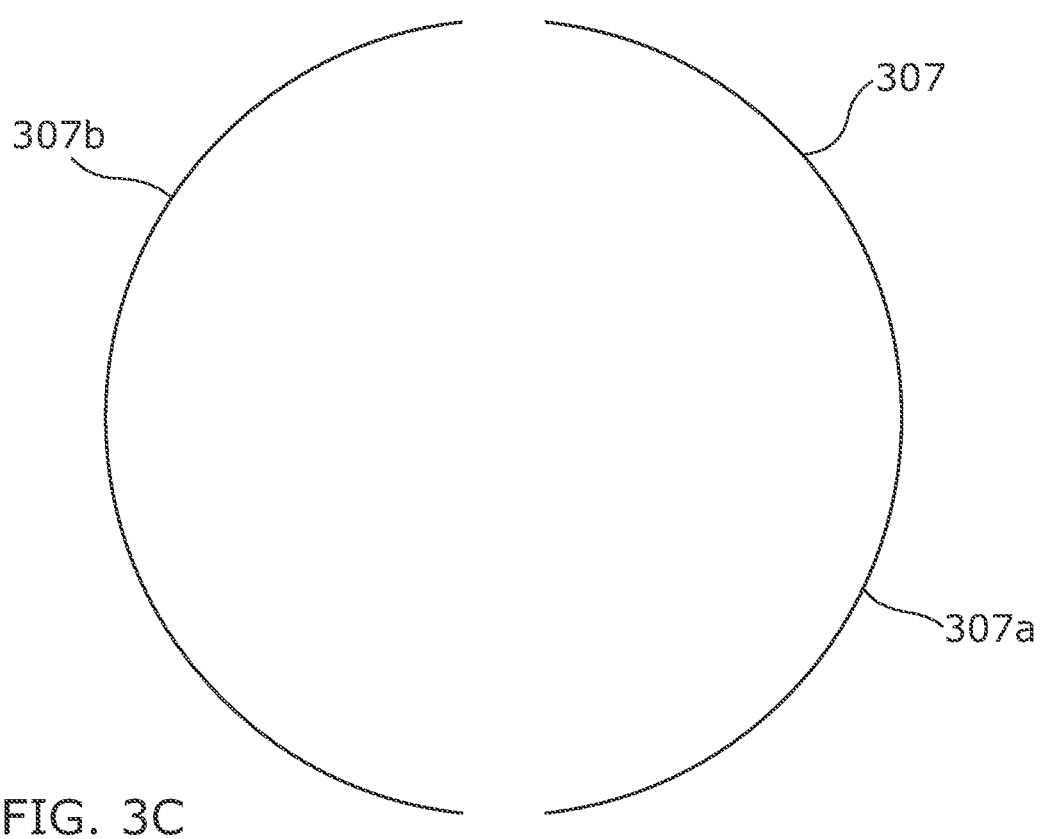
FIG. 3C shows a plan view of two approximately semi-annular support members arranged to provide support locations in a ring shape for use in a lens according to yet another embodiment of the invention.
Figure 3D:
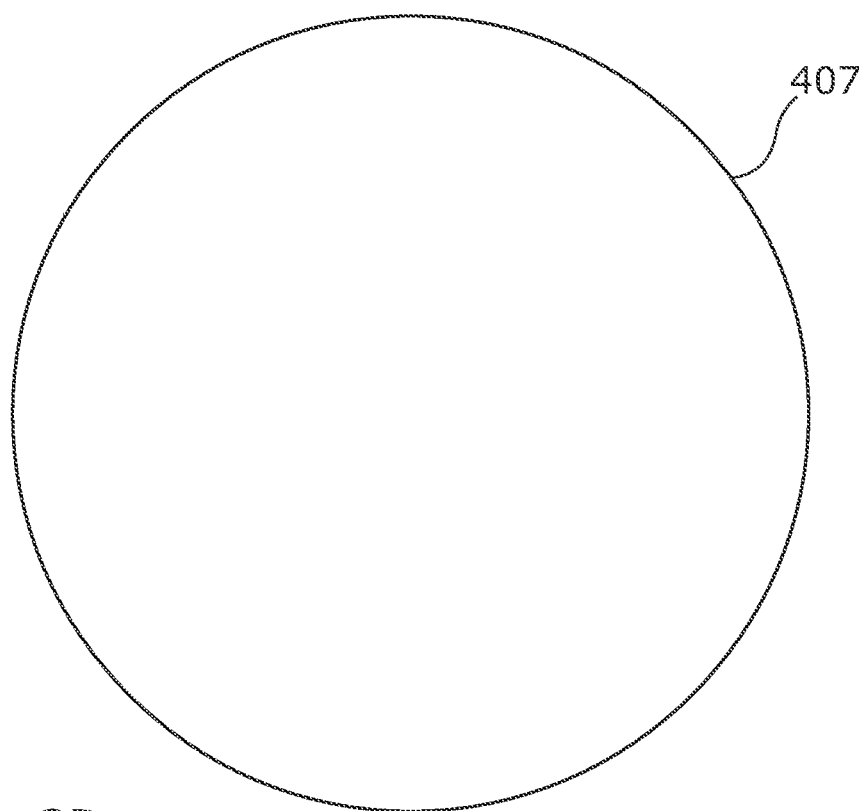
FIG. 3D shows a plan view of an annular support member that provides support locations in a ring shape for use in a lens according to another embodiment of the invention.

FIG. 3C shows a ring 307 formed from two arcuate posts 307a, 307b. Each arcuate post is a circular arc and has an arc angle of about 175°, with two small gaps between the arcuate posts.

The support members described above may be formed, for example, from a photo-sensitive material, such as a photopolymer. The photo-sensitive material may be exposed to suitable radiation using a radiation source and a mask, such exposure causing the exposed area to "harden" (or in some case, to "soften"). The "softened" or "unhardened" material can then be removed using a suitable solvent to leave the desired support members. The formation of support members using a mask is described in WO2019/030491.

A ring may also be formed, for example, by the selective placement of support members. For example, 50 micron spacer beads may be deposited on to a substrate, for example, using an automated deposition system to provide a ring of such spacer beads. For avoidance of doubt, there are gaps between the spacer beads.

Figure 4:
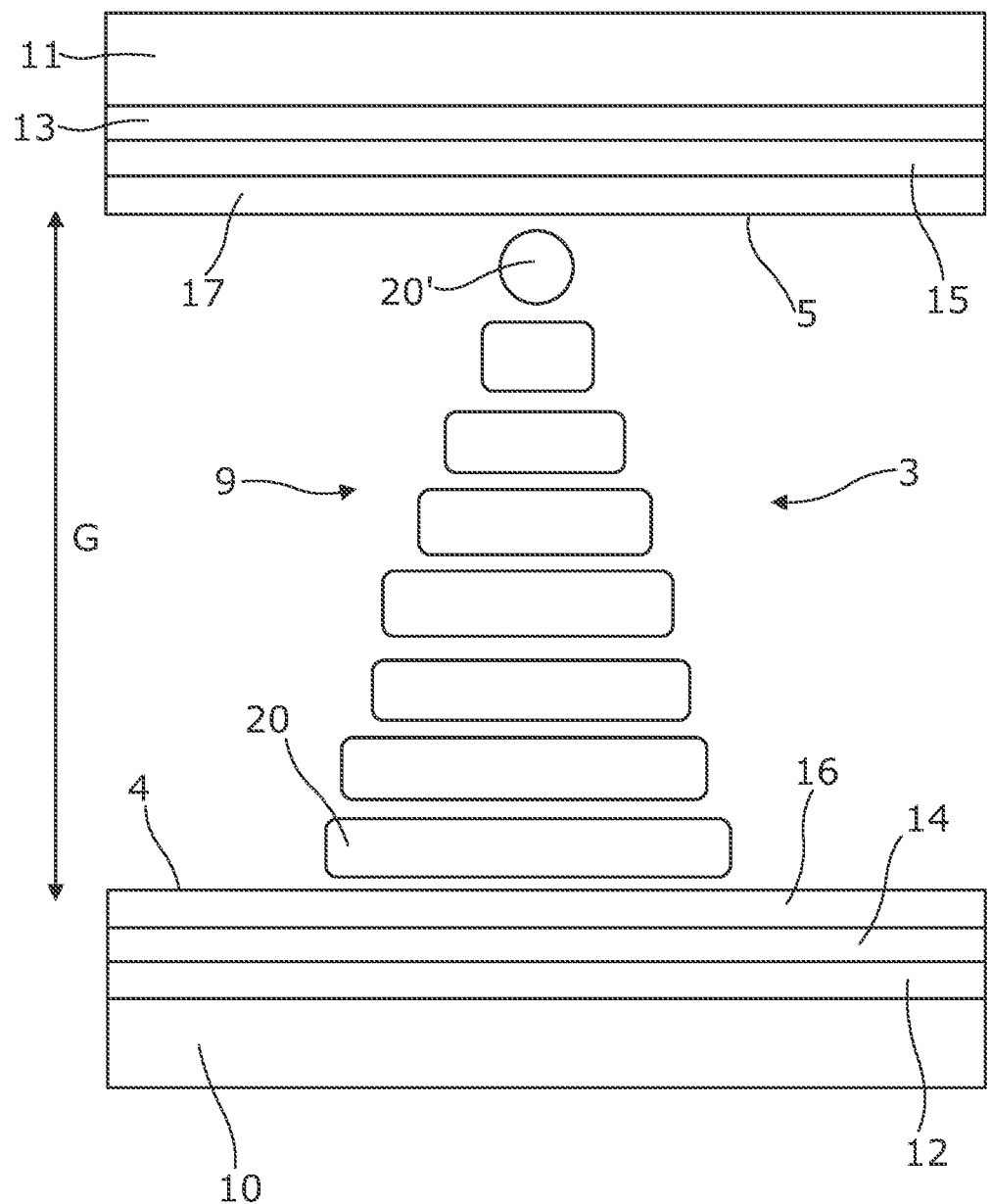
FIG. 4 shows a schematic cross-sectional view of an example of a liquid crystal cell according to an embodiment of the invention.

FIG. 4 shows a schematic cross-section of part of an example of a liquid crystal cell in accordance with the present invention. The liquid crystal cell 3 has a cell gap thickness, G, between a first inner surface 4 and a second inner surface 5 with liquid crystal 9 therebetween. The liquid crystal cell comprises a perimeter support configuration (not shown) to maintain a perimeter gap thickness at a perimeter of the liquid crystal cell. The perimeter support configuration comprises four strips of 50 micron thick spacer sheet, each strip forming a side of a square, and providing a perimeter gap thickness of approx. 50 microns. In the present case, the cell gap thickness, G, is also approx. 50 microns. The liquid crystal cell 3 comprises a plurality of support members (now shown) in the form of 50 micron spacer beads, wherein each support member is arranged to maintain the cell gap thickness, G, by providing support at a support location within the cell. Substantially all of the support members are arranged such that the support locations form a first, inner ring, and a second, outer ring, concentric with a centre of the liquid crystal cell. The first and second inner rings are substantially as shown in relation to FIG. 1, though the first and second inner ring of FIG. 4 are formed from a plurality of spacer beads with spaces therebetween, as opposed to a polymer annulus.

The liquid crystal cell 3 comprises a first flexible polymer substrate 10 and a second flexible polymer substrate 11. Each substrate 10, 11 is provided with an electrically-conductive layer 12, 13 formed from indium-tin oxide. The electrically-conductive layers 12, 13 are used to apply electrical signals to the liquid crystal 9 and change the orientation of the liquid crystal in order to change the optical characteristics of the liquid crystal cell. A barrier layer 14, 15 may be provided on each electrically-conductive layer 12, 13 to reduce surface roughness and to inhibit leaching of contaminants from the indium-tin oxide into the liquid crystal. A layer of alignment polymer 16, 17 is provided on top of the barrier layer 14, 15. Each layer of alignment polymer 16, 17 has been rubbed with a brush to align the alignment polymer. The liquid crystal 9 adjacent to the alignment polymer 16, 17 is aligned in a particular direction as shown in FIG. 4. Adjacent to first inner surface 4, the liquid crystal director 20 is parallel to the plane of the image, whereas adjacent to second inner surface 5, the liquid crystal director 20' is perpendicular to the plane of the image. Furthermore, the liquid crystal molecules adjacent to the first inner surface and the second inner surface are approximately parallel to first and second inner surfaces (there is a small pre-tilt of about 3-5°). The orientation of the liquid crystal molecules adjacent to the alignment polymers 16, 17 are effectively fixed, and the viscoelastic properties of the liquid crystal means that the liquid crystal adopts a twisted configuration as shown in FIG. 4. Application of an appropriate electric field will cause the orientation of the liquid crystal molecules to change, and therefore the optical properties of the liquid crystal to change, as is well-known to those skilled in the art.

Those skilled in the art will realise that the materials and thickness of the substrate, the electrically-conductive layer, the barrier layer and the alignment layer are chosen for satisfactory optical performance.

Figure 5:
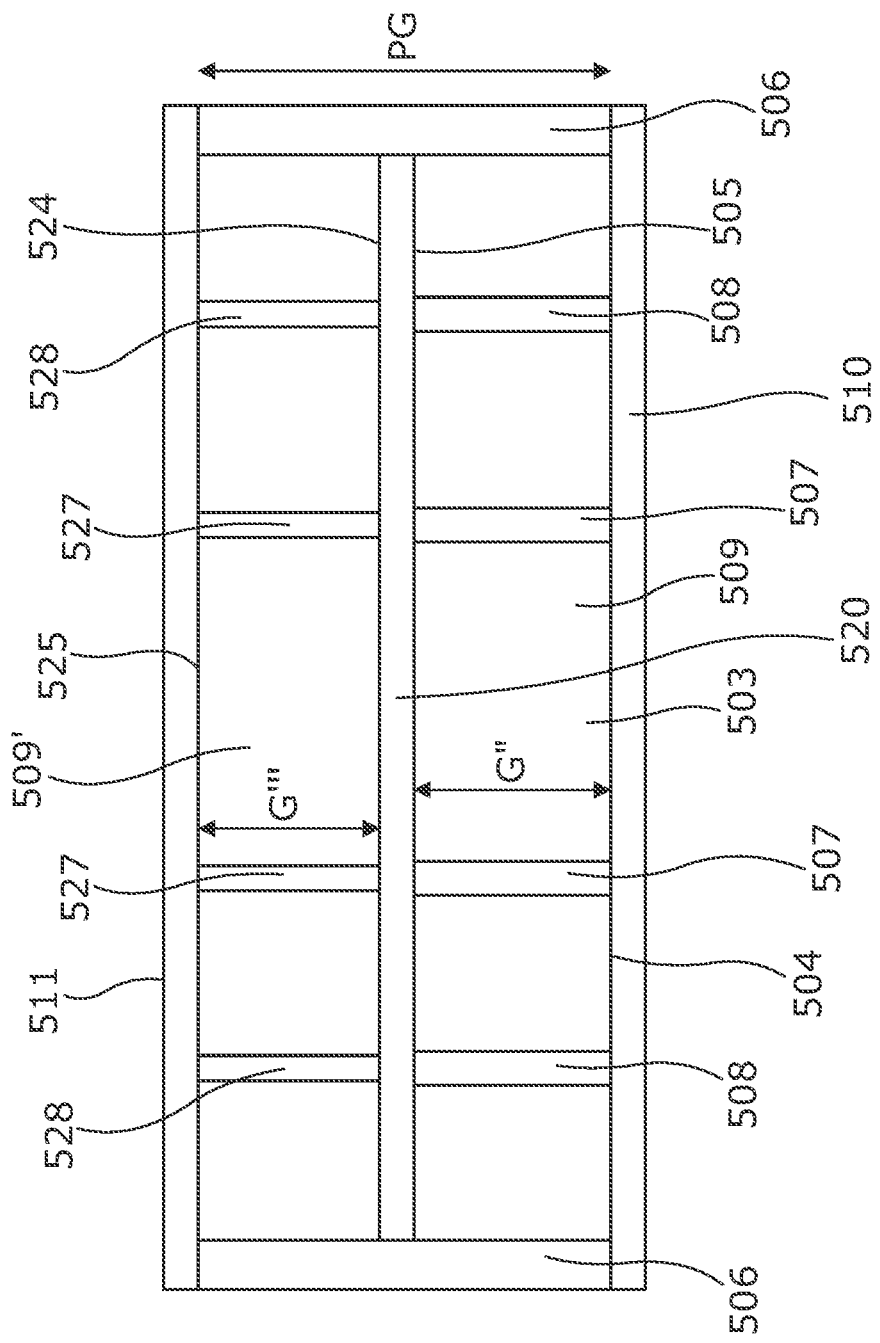
FIG. 5 shows a schematic cross-sectional view of a further example of a liquid crystal cell according to another embodiment of the invention.

FIG. 5 shows a schematic cross-section through a further example of an embodiment of the liquid crystal cell in accordance with the present invention. The flexible liquid crystal cell 503 has a cell gap thickness G" between a first inner surface 504 and a second inner surface 505 with liquid crystal therebetween. The liquid crystal cell 503 comprises a perimeter support configuration 506 to maintain a perimeter gap thickness PG at a perimeter of the liquid crystal cell. The support configuration 506 comprises four strips of 100 micron thick spacer sheet, each strip forming a side of a square, and providing a perimeter gap thickness PG of approx. 100 microns. The liquid crystal cell 503 comprises a first, inner, annular support member 507 and a second, outer, support member 508. Each support member 507, 508 is arranged to maintain the cell gap thickness G by providing support at a support location within the cell. The support locations form one or more rings concentric with a centre of the liquid crystal cell 503. Liquid crystal 509 is provided between the first 504 and second 505 inner surfaces.

Liquid crystal cell 503 comprises liquid crystal 509' that is in the same optic path as liquid crystal 509. The thickness of liquid crystal 509' corresponds to the cell spacing G''' between third 524 and fourth 525 inner surfaces. Cell spacing G''' is maintained by spacers 527 and 528. Spacer 527 is in the form of an inner annulus and spacer 528 is in the form of an outer annulus.

First inner surface 504 is supported by first substrate 510. Fourth inner surface 525 is supported by second substrate 511. Second 505 and third inner surfaces 524 are supported by inner substrate 520.

Figure 8:
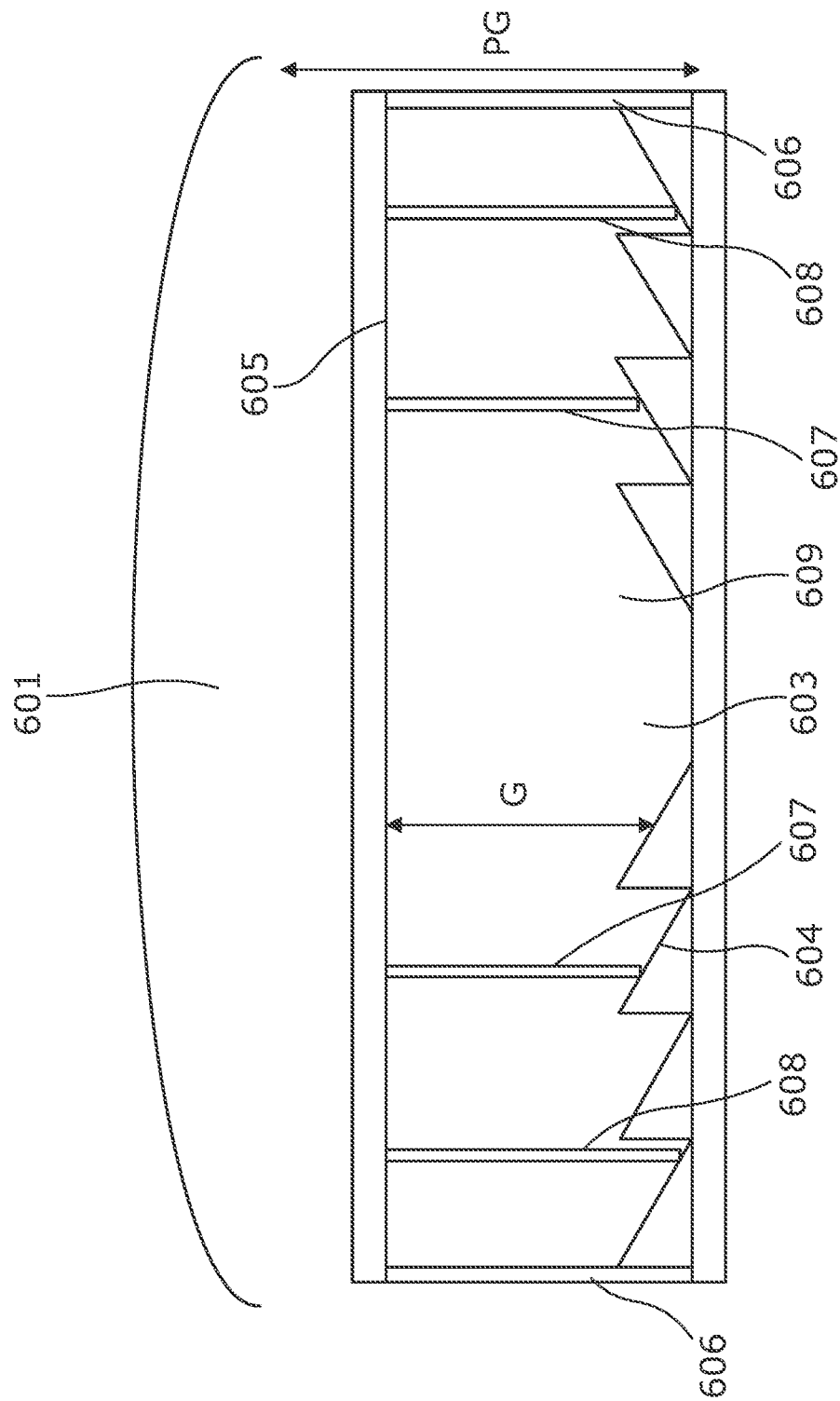
FIG. 8 shows a schematic cross-section through an example of a lens in accordance with an embodiment of the present invention, the lens comprising a Fresnel optical element.

FIG. 2 illustrates that the present invention may be used in relation to ophthalmic lenses comprising so-called meniscus lenses. Those skilled in the art will realise that other optical configurations are possible. For example, FIG. 8 shows a schematic cross section through an ophthalmic lens 601 comprising a liquid crystal cell flexible liquid crystal cell 603 that has a cell gap thickness G between a first inner surface 604 and a second inner surface 605 with liquid crystal therebetween. The liquid crystal cell 603 comprises a perimeter support configuration 606 to maintain a perimeter gap thickness PG at a perimeter of the liquid crystal cell. The support configuration 606 comprises a ring of 50 micron thick spacer sheet, and providing a perimeter gap thickness PG of approx. 50 microns. The liquid crystal cell 603 comprises a first, inner, annular support member 607 and a second, outer, support member 608. The shape of first inner surface 604 is defined by a Fresnel structure (a series of annular features that provide crests and troughs). Each support member 607, 608 is arranged to maintain the cell gap thickness G by providing support at a support location within the cell. The cell gap thickness G is not the same across the liquid crystal cell due to the presence of the Fresnel structure. In this case, the height of the support member 607 is smaller than that of support member 608. The support locations form one or more rings concentric with a centre of the liquid crystal cell 603. Liquid crystal 609 is provided between the first 604 and second 605 inner surfaces. Those skilled in the art will realise that other optical configurations, such as gradient-indexed lenses (GRIN) lenses may be achieved using the present invention.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

The examples above demonstrate that the liquid crystal cell may comprise two concentric rings of support locations to maintain a cell gap thickness. Those skilled in the art will realise that other arrangement are possible, for example, with one (and only one) ring of support locations, or with more than two rings of support locations.

The examples above demonstrate that the rings are substantially annular. Those skilled in the art will realise that the ring need not be annular.

The examples above demonstrate lenses with particular alignments of liquid crystal. Those skilled in the art will realise that other alignments or arrangements of liquid crystal may be used, depending on the optical effect that is required.

The examples above describe contact lenses. Those skilled in the art will realise that other ophthalmic lenses may be used.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. An electrically-switchable flexible ophthalmic lens for conforming to the eye of a user, the lens comprising:
 a liquid crystal cell for changing at least one optical characteristic of the ophthalmic lens, and having a cell gap thickness that is a distance from a first inner surface to a second inner surface with liquid crystal therebetween, the liquid crystal cell having a chord radius, w, and comprising:
 a plurality of support members, wherein each support member is arranged to maintain the cell gap thickness by providing support to the first inner surface and the second inner surface at one or more support locations within the liquid crystal cell,
 wherein the support members are arranged to define an annular shape such that the support locations form two rings concentric with a centre of the liquid crystal cell, the first ring located a chord measurement of 0.26-0.34 w from the centre of the liquid crystal cell and the second ring located a chord measurement of 0.52-0.70 w from the centre of the liquid crystal cell.

2. The lens according to claim 1, wherein the first ring is located a chord measurement of 0.30-0.34 w from the centre of the liquid crystal cell.

3. The lens according to claim 2, wherein the second ring is located a chord measurement of 0.60-0.68 w from the centre of the liquid crystal cell.

4. The lens according to claim 1, wherein the second ring is located a chord measurement of 0.60-0.68 w from the centre of the liquid crystal cell.

5. The lens according to claim 1, wherein the support locations form two (and only two) rings.

6. The lens according to claim 1, wherein at least one of the first ring and the second ring is formed by more than one support member.

7. The lens according to claim 6, wherein the distance between adjacent support members forming a respective ring is approximately the same.

8. The lens according to claim 1, wherein one or more of the support members is a post, a sphere, a cylinder, an ellipsoid, an ovoid, elongate, annular, hemi-annular or arcuate.

9. The lens according to claim 1, wherein the cell gap thickness is substantially the same across the liquid crystal cell.

10. The lens according to claim 1, wherein the cell gap thickness is not the same across the liquid crystal cell.

11. The lens according to claim 1, wherein the liquid crystal cell comprises a perimeter support configuration to maintain a perimeter gap thickness at a perimeter of the liquid crystal cell, wherein the second ring is spaced apart from the perimeter such that a portion of the liquid crystal is therebetween.

12. The lens according to claim 1, wherein substantially all of the support members are arranged such that the support locations form two rings, there being substantially no support locations that do not form one of rings.

13. The lens according to claim 1, wherein the liquid crystal cell has a cell spacing between a third inner surface and a fourth inner surface with liquid crystal therebetween, the liquid crystal between the third and fourth inner surfaces being in substantially the same optic path as the liquid crystal between the first and second inner surfaces.

14. The lens according to claim 13, wherein the liquid crystal cell comprises one or more spacers for maintaining the cell spacing between the third inner surface and the fourth inner surface.

15. The lens according to claim 14, wherein substantially all of the spacers are arranged so that the support locations form one or more rings concentric with a centre of the liquid crystal cell.

16. The lens according to claim 15, wherein the support locations form two (and only two) rings concentric with a centre of the liquid crystal cell.

17. The lens according to claim 1 comprising a Fresnel lens structure, wherein the Fresnel lens structure defines the shape of one of the first and second surfaces, and in which the liquid crystal disposed between the first and second surfaces is switchable between a first and a second liquid crystal configuration, the difference in the refractive index between the liquid crystal and the material forming the Fresnel lens structure being less in one of the first and second liquid crystal configuration than in the other of the first and second liquid crystal configuration.

18. The lens according to claim 1 comprising a meniscus lens, wherein one of the first and second surfaces is a convex surface and the other of the first and second surfaces is a concave surface, the curvatures of the first and second surfaces being the same or different.

19. The lens according to claim 1 comprising a gradient-index (GRIN) lens.

20. An electrically-switchable flexible ophthalmic lens for conforming to the eye of a user, the lens comprising:
a liquid crystal cell for changing at least one optical characteristic of the ophthalmic lens, and having a cell gap thickness that is a distance from a first inner surface to a second inner surface with liquid crystal therebetween, and comprising:
one or more support members, wherein each support member is arranged to maintain the cell gap thickness by providing support to the first inner surface and the second inner surface at one or more support locations within the liquid crystal cell,
wherein substantially all of the support members are arranged to define an annular shape such that the support locations form one or more rings concentric with a centre of the liquid crystal cell.

* * * * *